US009938153B2

United States Patent
Furquan et al.

(10) Patent No.: US 9,938,153 B2
(45) Date of Patent: Apr. 10, 2018

(54) METHOD OF PREPARING SILICON FROM SAND

(71) Applicant: Indian Institute of Technology Bombay, Mumbai (IN)

(72) Inventors: Mohammad Furquan, Mumbai (IN); Savithri Vijayalakshmi, Mumbai (IN); Sagar Mitra, Mumbai (IN)

(73) Assignee: INDIAN INSTITUTE OF TECHNOLOGY BOMBAY, Maharashtra (IN)

( * ) Notice: Subject to any disclaimer, the term of this patent is extended or adjusted under 35 U.S.C. 154(b) by 15 days.

(21) Appl. No.: 15/171,226

(22) Filed: Jun. 2, 2016

(65) Prior Publication Data

US 2017/0291821 A1    Oct. 12, 2017

(30) Foreign Application Priority Data

Apr. 6, 2016  (IN) .............................. 201621012185

(51) Int. Cl.
*C01B 33/023*      (2006.01)
(52) U.S. Cl.
CPC .................. *C01B 33/023* (2013.01)
(58) Field of Classification Search
CPC .................................................. C01B 33/023
See application file for complete search history.

(56) References Cited

U.S. PATENT DOCUMENTS

| 4,102,764 A * | 7/1978 | Harvey, II | B01J 10/005 136/261 |
| 5,090,996 A * | 2/1992 | Cameron | C22B 4/005 75/10.19 |
| 5,139,762 A * | 8/1992 | Flagella | B01J 8/24 422/145 |
| 5,279,716 A * | 1/1994 | Sharma | C25C 3/04 205/404 |
| 5,803,947 A * | 9/1998 | Engell | C01F 5/02 420/129 |
| 7,972,584 B2 * | 7/2011 | Blencoe | C01B 3/04 423/348 |
| 2008/0038170 A1 * | 2/2008 | Sandhage | B81C 99/0095 423/155 |

(Continued)

OTHER PUBLICATIONS

Favors et al., "Scalable Synthesis of Nano-Silicon from Beach Sand for Long Cycle Life Li-ion Batteries," Scientific Reports 4 : 5623, DOI: 10.1038/srep05623. Published Jul. 8, 2014.*

*Primary Examiner* — Anthony J Zimmer (57) ABSTRACT

Embodiments herein provide a method of preparing Silicon (Si) from sand ($SiO_2$).The method includes preparing sand particles with a size less than 50 microns. Further, the method includes obtaining Magnesium (Mg) particles with a size in range of 105-150 microns. Further, the method includes mixing sand and Mg particles in a predefined ratio to obtain a Sand-Magnesium (SM) mixture. Further, the method includes subjecting the SM mixture to heating at a temperature for a predefined time to obtain Si sample. Further, the method includes identifying un-reacted portion of Mg and sand particles. Furthermore, the method includes purifying byproducts of magnesium as well as un-reacted-magnesium and silica to obtain pure Si.

14 Claims, 5 Drawing Sheets

(56) References Cited

U.S. PATENT DOCUMENTS

2009/0010833 A1* 1/2009 Rosenband ........... C01B 33/021
                                                423/349
2009/0241730 A1* 10/2009 Gladkov ................. C01B 33/04
                                                 75/392
2010/0284887 A1* 11/2010 Mai ....................... B01J 19/126
                                                423/350

* cited by examiner

METHOD OF PREPARING SILICON FROM SAND

TECHNICAL FIELD

The present invention relates to a method of preparing Silicon (Si) from sand ($SiO_2$). The present application is based on, and claims priority from an Indian Application Number 201621012185 filed on 6 Apr. 2016, the disclosure of which is hereby incorporated by reference.

BACKGROUND

Silicon (Si), in the form of sand, is one of the most abundant elements on the earth's crust, is used in a variety of applications ranging from construction materials such as clay and concrete to soluble silicates and ultra pure silicon used for solid state electronic devices.

Si can also provide a major breakthrough in the production of eco-friendly clean energy. The threat of depletion of the non-renewal energy resources such as fossil fuels for producing energy can be safely handled, if Si based energy production technology is established. The primary raw material used for production of Si is sand ($SiO_2$) which forms about 25.7 wt % of earth's crust. The method of synthesizing Si from sand has been attempted from ancient times. Sonic of the conventional reactions for conversion of sand to silicon are carbothermic, magnesiothermic and aluminothermic. These reactions require availability of temperatures in the range of 2000° C. to 3000° C. As such, there has not been much development of these methods of producing Si from sand. For industrial purposes, sand is reduced to pure Si by heating it with coke at temperatures above 3000° C. which produces a large amount of Carbon Di-Oxide ($CO_2$). This method has high energy consumption and generates non-eco-friendly gases ($CO_2$) during this process of synthesis.

The above information is presented as background information only to help the reader to understand the present invention. Applicants have made no determination and make no assertion as to whether any of the above might be applicable as Prior Art with regard to the present application.

SUMMARY

Accordingly the embodiments herein provide a method of preparing Silicon (Si) from sand ($SiO_2$).The method includes preparing sand particles with size less than 50 microns. Further, the method includes obtaining Magnesium (Mg) particles with a size in range of 105-150 microns. Further, the method includes mixing the sand and Mg particles in a predefined ratio to obtain a Sand-Magnesium (SM) mixture. Further, the method includes subjecting the SM mixture to heating at a temperature for a predefined time to obtain Si. Further, the method includes identifying un-reacted portion of Mg and silica and their compounds to obtain pure Si.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Accordingly the embodiments herein provide a method of preparing Silicon (Si) from sand ($SiO_2$).The method includes obtaining sand particles with size less than 50 microns. The sand particles are obtained by washing the sand with an alkali and Hydrochloric (HCl) acid, which is followed by washing with distilled water. The sand particles are then dried at a temperature for a predefined time. Further, the method includes obtaining Magnesium (Mg) particles with a size in range of 105-150 microns. Further, the method includes mixing the sand and Mg particles in a predefined ratio to obtain a Sand-Magnesium (SM) mixture. Further, the method includes heating the SM mixture at a temperature for a predefined time to obtain Si sample. Further, the method includes purifying obtained Si sample by removing un-reacted portion of Mg, silica and their compounds to obtain pure Si washed with HCl, Hydrogen Fluoride (HF) and De-Ionized (DI) water, which is further dried and stored in desiccators.

An economical and eco friendly method, capable of being implemented in a single step, is presented for preparing Si from sand ($SiO_2$) using the magnesiothermic reduction of sand. The purity of the Si formed using the method is confirmed mainly by the X-Ray Diffraction (XRD) analysis. The morphology of the end product is analyzed using Field Emission Scanning Electron Microscopy (FE-SEM) and Field Emission Transmission Electron Microscopy (FE-TEM). The major equipments required for the magnesiothermic reaction of sand are microwave furnace, silica crucibles with lid, mortar and pestle, sensitive weighing balance, magnetic stirrers and glass bottles.

Initially sand is collected from sand dunes and washed with alkali, HCl and distilled water for removing any trace of acid or alkali existing in the sand. The washed sand, after drying in an oven at 120° C. for 3 hours, is pulverized for obtaining sand particles with size less than 50 microns. Mg is also pulverized and sieved for obtaining Mg powder with different particle sizes. The sand and Mg powder is mixed using a mortar pestle and subsequently heated in a microwave furnace in which a magnesiothermic reduction reaction takes place, resulting in the formation of Si. The magnesiothermic reduction is demonstrated as follows $$2Mg(s)+SiO_2(s) \rightarrow 2MgO(s)+Si(s)$$

Experiments are conducted for analyzing the process of formation of Si from sand using various process conditions such as, type of sand, sand and Mg particle size, temperature and heating time in the microwave furnace. The effect of particle size and composition of Mg in the magnesiothermic conversion reaction, resulting in the formation of Si, during microwave heating is analyzed as well. The Si sample, formed after the magnesiothermic reaction, is washed with HCl, HF and DI water for removing un-reacted portions of Mg particles and its compounds, un-reacted sand particles, or the like. Then the washed Si sample is dried at 120° C., and stored in desiccators. The SM mixture samples can be labeled as $SM_X(Y)$, wherein S denotes sand, 'M' denotes Mg, 'X' denotes particle size of Mg and 'Y' denotes the duration of heating in the microwave furnace in minutes. Thus the sample $SM_{<45}(5)$ denotes the SM mixture prepared using sand and Mg, having a particle size, less than 45 microns, and subjected to heating in the microwave furnace at a temperature of 800° C. for 5 minutes.

The Si sample prepared from the method can be in powder form.

In order to analyze the effect of sand particle size used for preparation of Si, a weighed mixture of sand and Mg powder (the ratio of sand and Mg powder is 1:1) is prepared. The varieties of sand particle sizes include nanoparticle sand (with a particle size in the range of 10-15 nm), sand with a particle size in the range of 0.5-10 μm, and sand with a particle size in the range of 10-50 μm. The sand belonging to any one of the categories (based on particle size) and Mg powder with a particle size in the range of 105-150 microns are mixed, resulting in the formation of SM mixtures. In order to have uniformity in the quality of the sand, commercial grade of sand procured from Sigma Aldrich having particle size 0.5-10 μm has been used. The corresponding SM mixtures are heated in the microwave furnace at 800° C. for 30 minutes. The SM mixtures, subjected to heating in a microwave furnace, results in formation of Si samples. The Si samples are washed with 20 ml of 5M HCl per gram and stirred on a magnetic stirrer for 60 minutes at 100° C. The Si sample after stirring is centrifuged and repeatedly washed with DI water. The washed Si samples are then dried in an oven at 120° C. for 12 hours and stored in desiccators. The Si thus obtained from sand particles of different sizes are analyzed using XRD and FE-SEM. The XRD analysis confirms the formation of Si samples for all SM mixtures, in which sand particles of different sizes are involved. It is noted that the source of sand or its particle size practically does not have any effect in the conversion of sand to Si.

In order to analyze the effect of Mg particle size used for preparation of Si, pulverized Mg is sieved and fractions with particle size in the range, less than 45 μm, 45-63 μm, 63-105 μm, 105-150 μm, 150-200 μm and 200-250 μm are collected. One gram of sand is thoroughly mixed with one gram of each of the different Mg powders having different particle sizes mentioned above. The different SM mixture samples is transferred to silica crucibles and covered with the lids. They are heated in the microwave furnace at 800° C. for 30 minutes, resulting in formation of Si samples. The Si samples are allowed to cool to room temperature inside the microwave furnace before being collected. The color and texture of the Si samples change with the increase in particle size of the Mg powder, used in the SM mixture. The Si samples, after being subjected to heating in the microwave furnace, are washed with HCl, HF and DI water for removing un-reacted portions of sand and Mg particles. The washed Si samples are then dried and stored in desiccators. The XRD analysis of these Si samples reveals the criticality of Mg particle size in the conversion of sand to Si. When the Mg particle size of the SM mixture is less than 45 μm, the conversion of sand to Si is negligible. From XRD pattern of the Si sample obtained from this SM mixture, a composite material of Mg and sand which is similar to magnesium silicate is formed. The maximum conversion of sand to Si is observed when the Mg particle size of the SM mixture is in the range of 105-150 μm.

Aliquots of the obtained Si samples are collected from the microwave furnace and added to different concentrations (1M, 2.5M, 5M, and 7.5M) of HCl, with a fixed volume, at room temperature and at 100° C. respectively. Then the Si samples, added with HCl, are stirred on a magnetic stirrer for 60 minutes. The HCl is centrifuged out, and the Si samples washed with DI water. Adding Si samples with HCl having different concentrations mentioned above, partially removes the un-reacted Mg and other compounds of Mg from the aliquots of the Si samples. However, complete removal of Mg and its by-products is possible by washing per gram of the aliquots of the Si samples using 20 ml of 5M HCl at 100° C. and stirring on a magnetic stirrer for 60 minutes.

However, very minor traces of sand which may be present as an impurity in the obtained Si sample can be removed by washing with dilute HF (0.2%), followed by washing with DI water. Washing Si sample with dilute HF solutions (0.2, 0.5, 1.0 and 1.5%) is performed by soaking the Si sample in dilute HF solutions for 10 to 30 minutes. The Si sample is further subjected to centrifuging, washing with DI water, and dried in an oven at 120° C. for 12 hours. It is observed that the Si sample, washed with 0.2% HF, results in removal of traces of SiO2. However, using higher concentrations of HF for washing results in the erosion of Si particles. This leads to the lowering of final Si yield.

The percentage of Si yield, using the proposed method of conversion of sand to Si, is calculated by weighing the raw materials and the products at various steps of the method. The % wt of Si, prepared from sand using magnesiothermic reduction, by heating the SM mixture in microwave furnace, are obtained in six different batches. The weight difference at various stages is recorded and the average is taken to determine the Si yield. The average weight of the reactants and the Si obtained from the experiments are tabulated in Table 1. Theoretically sand contains 46.66% of Si. From Table 1 it is found that about 45% of Si is formed after washing with HF. The Si yield is found to be close to the theoretical value. The FE-SEM analysis of the raw materials (sand, magnesium), Si samples obtained after heating in microwave furnace, and Si samples after washing with HCl and HF; is performed. The morphology of the obtained Si sample is observed by FE-TEM analysis as well.

TABLE 1

Average weight of the reactants and Si obtained in 5 batches

| Weight of sand | Mg | Weight loss on heating in the microwave furnace | Weight loss of heated product on washing with HCl | Weight loss of the HCl washed product on washing with HF |
|---|---|---|---|---|
| 1.0035 g | 1.0057 g | 0.0753 g | 0.6965 g | 0.4502 g |

Experiments conducted with 1:1 combination of sand and Mg with particle size in the range of 105-150 μm, heated at 800° C. for 5 minutes in the microwave furnace, yield Si. The percentage weight of Si formed after heating the SM mixture in the microwave furnace for 5 and 30 minutes is tabulated in Table 2.

TABLE 2

Comparison of Si yield for different durations of heating in microwave furnace

| | % Wt. of Si. after washing with HCl | |
|---|---|---|
| Batch No. | Heating in microwave furnace for 5 minutes | Heating in microwave furnace for 30 minutes |
| 1 | 70.5 | 70.1 |
| 2 | 69.4 | 71.6 |
| 3 | 68.6 | 71.1 |
| 4 | 68.0 | 70.4 |
| 5 | 71.4 | 71.6 |
| Average | 69.6 | 70.9 |

The prepared Si sample can replace the graphite anode in the Lithium (Li-ion) battery, which can play a crucial role in the development of next generation Li-ion battery. Having a Si anode in the Li battery would enhance the efficiency of the. Li-ion battery by approximately ten times in comparison with the existing Li-ion batteries.

Figure 1:
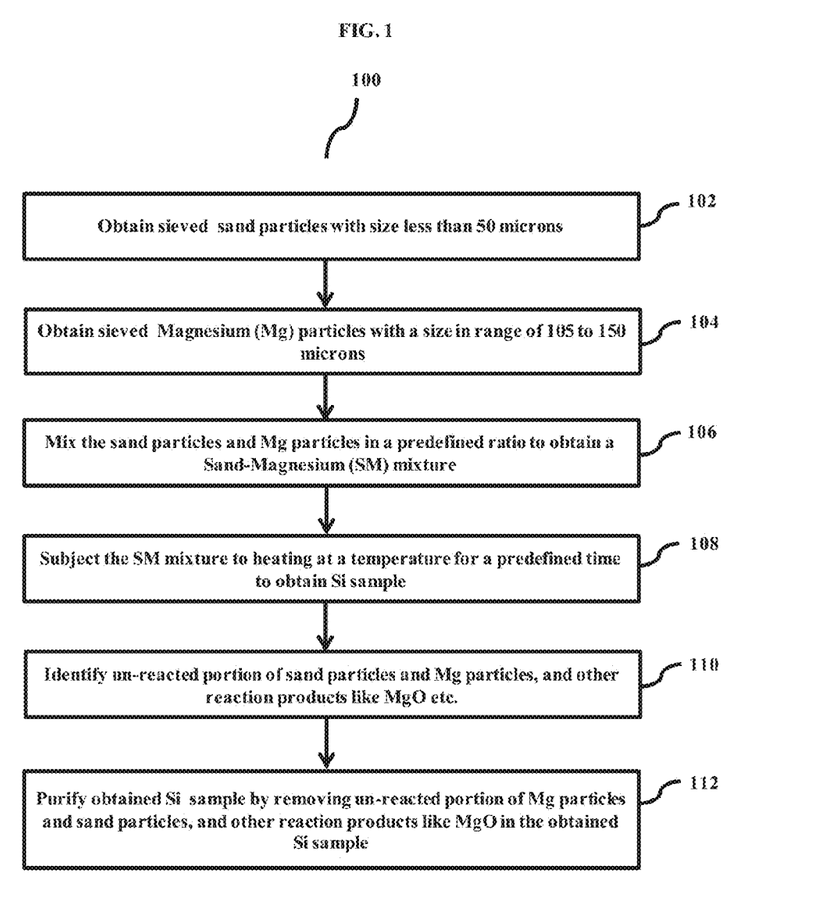
FIG. 1 is a flow chart depicting the method of preparing Silicon (Si) from sand($SiO_2$), according to the embodiments as disclosed herein.
Figure 2A:
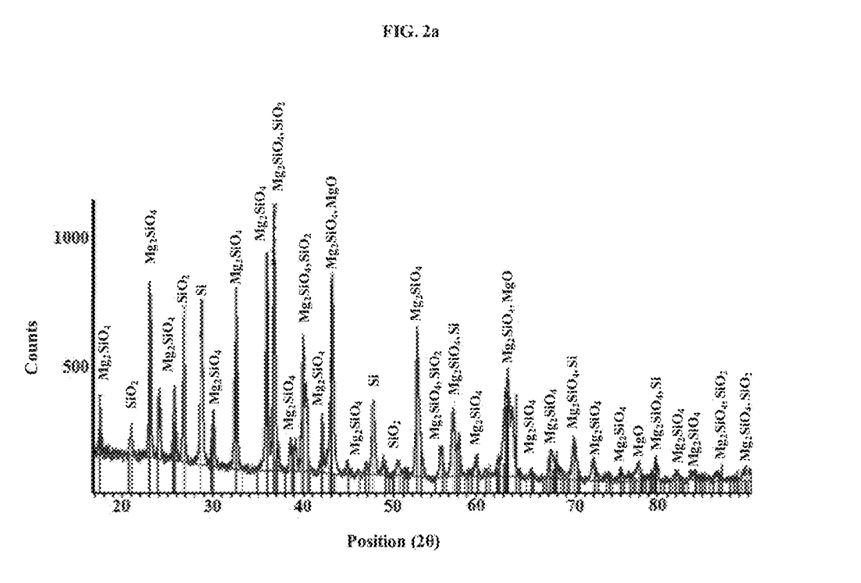
FIGS. 2a and 2b illustrate X-Ray Diffraction (XRD) pattern of $SM_{<45}(30)$ and $SM_{105-150}(30)$ respectively, according to the embodiments as disclosed herein.
Figure 2B:
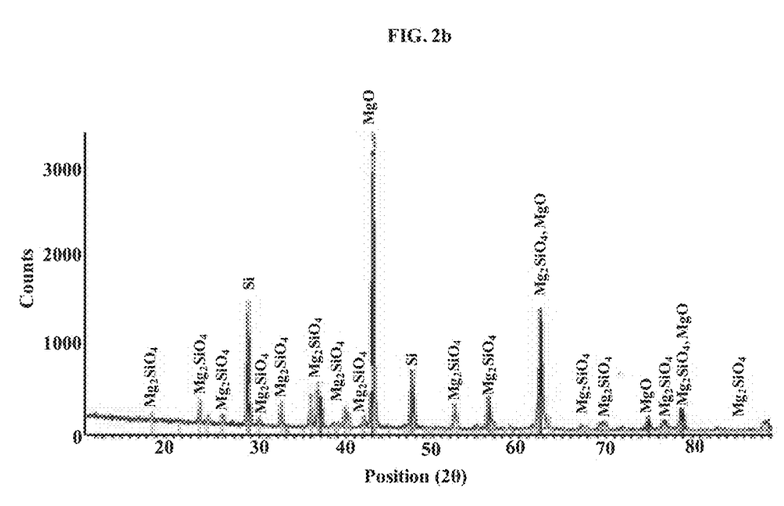
Figure 2C:
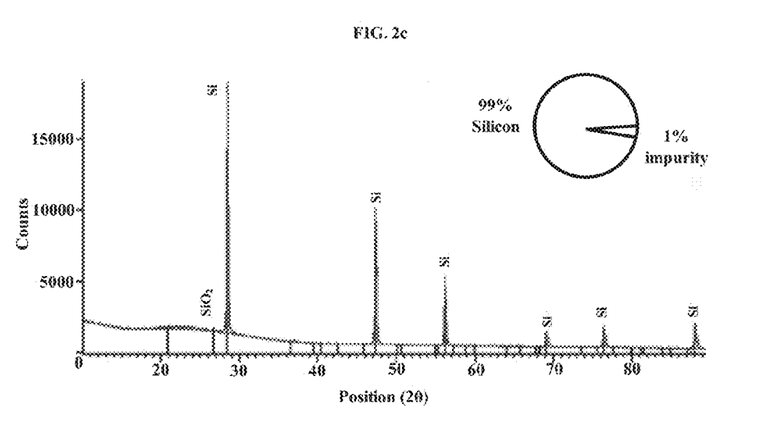
FIG. 2c illustrates XRD pattern of $SM_{105-150}(5)$, heated at a temperature of 800° C., and washed with 5M Hydrochloric-acid (HCl), according to the embodiments as disclosed herein.
Figure 2D:
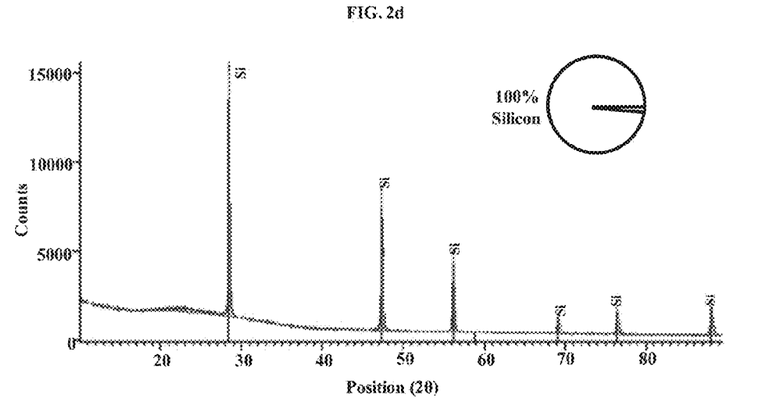
FIG. 2d illustrates XRD pattern of $SM_{105-150}(5)$, heated at a temperature of 800° C., and washed with 5M HCl and 0.2% Hydrogen Fluoride (HF), according to the embodiments as disclosed herein.

Referring now to the drawings and more particularly to FIGS. 1 through 2d where similar reference characters denote corresponding features consistently throughout the figures, there are shown preferred embodiments.

FIG. 1 is a flow chart depicting the method of synthesizing Silicon (Si) from sand ($SiO_2$), according to the embodiments as disclosed herein.

At step 102, the method 100 includes obtaining sieved sand particles with a size less than 50 microns. Initially sand is collected and washed with alkali, HCl and distilled water for removing impurities that may be existing in the sand. The washed sand, after being dried at a temperature of 120° C. for 3 hours, is pulverized for obtaining sand particles with size less than 50 microns. However, the source of sand or its particle size practically does not have an effect on the conversion of sand to Si.

At step 104, the method 100 includes obtaining sieved Mg particles with a size in range of 105-150 microns. Mg is pulverized and sieved for obtaining magnesium powder with different particle sizes. The effect of Mg particle size, used for preparation of Si, is analyzed by considering six batches of Mg particles with size: less than 45 μm, 45-63 μm, 63-105 μm, 105-150 μm, 150-200 μm and 200-250 μm. The maximum conversion of sand to Si is observed when the Ma particle size is in the range of 105-150 μm. Thus, Mg particles with size belonging to this range are considered for mixing with sand particles to obtain Sand-Magnesium (SM) mixture.

At step 106, the method 100 includes mixing the sand and Mg particles in a predefined ratio to obtain a SM mixture. In an embodiment, the ratio of sand and Mg powder can be 1:1. In an embodiment, the sand and Mg powder is mixed using a mortar pestle to obtain SM mixture.

At step 108, the method 100 includes heating the SM mixture at a temperature for a predefined time to obtain Si sample. In an embodiment, the SM mixture can be heated in a microwave furnace for preparing Si sample using magnesiothermic reduction reaction. The magnesiothermic reaction is as follows:

$$2Mg(s)+SiO_2(s) \rightarrow 2MgO(s)+Si(s)$$

The SM mixture is subjected to heat in the microwave furnace at a temperature of 800° C. for 5 minutes (predefined time) for obtaining Si sample.

At step 110, the method 100 includes identifying un-reaction portion of sand particles and Mg particles. The un-reacted portion of sand particles and Mg particles are confirmed using XRD pattern analysis.

At step 112, the method 100 includes purifying obtained Si sample by removing un-reacted portion of Mg particles, sand particles and other reaction products like MgO etc. from the obtained Si sample. In an embodiment, the un-reacted portion of the Mg particles in the obtained Si sample is removed by adding a certain concentration of HCl at a predefined temperature to the obtained Si sample. In an embodiment, the un-reacted portion of the Mg particles combined with HCl, can be stirred in a magnetic stirrer for approximately 60 minutes. The HCl is then removed from the Si sample by centrifugation after which it is washed with DI water. Further, the un-reacted portion of sand particles in the obtained Si sample is removed by washing the Si sample with HF, further followed by washing with DI water. In an embodiment, the Si sample can be dried in an oven at a temperature of 120° C. for 12 hours.

The various actions, acts, blocks, steps, or the like in the method 200a may be performed in the order presented, in a different order or simultaneously. Further, in some embodiments, some of the actions, acts, blocks, steps, or the like may be omitted, added, modified, skipped, or the like without departing from the scope of the invention.

FIGS. 2a and 2b illustrate X-Ray Diffraction (XRD) pattern of $SM_{<45}(30)$ {Sand and Magnesium mixture with a particle size less than 45 μm, and heated in a microwave furnace for 30 minutes} and $SM_{105-150}(30)$ respectively, heated at a temperature of 800° C., according to the embodiments as disclosed herein.

All the obtained Si samples, collected from the microwave furnace, before and after washing with HO, are analyzed using XRD. About 50 mg of Si sample is loaded in the XRD sample holder and is scanned using Cu Kα X-Ray beam having wavelength of $1.54 \times 10^{-10}$, in the 2θ range, 10°-90°. It is found that the rate of reduction of sand to Si increases with the increase in size of Mg particles. When the Mg particle size is less than 45μ, Magnesium-Silicate ($Mg_2SiO_4$) peaks are dominant as depicted in FIG. 2a. When Mg particle size is in the range of 105-150 μm, the dominant magnesium-silicate peaks significantly disappeared. However, the XRD analysis depicts Magnesium Oxide (MgO) and Si peaks (FIG. 2b).

FIG. 2c illustrates XRD pattern of $SM_{105-150}(5)$, heated at a temperature of 800° C., and washed with 5M HCl, according to the embodiments as disclosed herein. It is thus confirmed that using Mg particles with size greater than 105 µm needs to be used for the reduction of $SiO_2$ to Si. This is performed by subjecting the SM mixture sample to heating in microwave furnace at 800° C. for five minutes.

FIG. 2d illustrates XRD pattern of $SM_{105-150}(5)$, heated at a temperature of 800° C., and washed with 5M (HCl) and 0.2% Hydrogen Fluoride (HF), according to the embodiments as disclosed herein. It is observed from XRD analysis of the Si sample washed with 0.2% HF results in removal of traces of $SiO_2$ and yields pure Si.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method of preparing Silicon (Si) from sand ($SiO_2$), the method comprising:
    preparing sand particles with a size less than 50 µm;
    preparing Magnesium (Mg) particles with a size in range of 105-150 µm;
    mixing said sand particles and said Mg particles in a predefined ratio to obtain a Sand-Magnesium (SM) mixture;
    subjecting said SM mixture to heat at a temperature for a predefined time to obtain Si sample; and
    purifying said obtained Si sample by removing a portion of Mg by-product particles in said obtained Si sample.

2. The method of claim 1, wherein said sand particles are obtained by:
    washing sand with an alkali and Hydrochloric acid (HCl) and followed by washing with distilled water;
    drying said washed sand at a temperature for a predefined time; and
    pulverizing said washed sand.

3. The method of claim 1, wherein said SM mixture is heated in a microwave furnace at a temperature of 800° C. for duration of five minutes.

4. The method of claim 1, wherein said portion of Mg by-product particles in said obtained Si sample is purified by:
    adding a predefined concentration of HCl at a predefined temperature to said Si sample;
    stirring for a predefined time;
    subjecting said Si sample to centrifugation for removing HCl from said Si sample; and
    washing said Si sample with De-Ionized (DI) water.

5. The method of claim 1, wherein said portion of Mg by-product particles in said Si sample is purified by:
    washing said Si sample with HCl followed by washing with DI water; and
    drying said washed Si sample at a predefined temperature for a predefined time.

6. The method of claim 1, wherein said Si sample is obtained without washing said sand particles using HF.

7. The method of claim 1, wherein said portion of Mg by-product particles comprises at least one of $Mg_2SiO_4$ and Magnesium oxide (MgO).

8. A method of preparing Silicon (Si) from sand ($SiO_2$), the method comprising:
    preparing sand particles with a size less than 50 µm;
    preparing Magnesium (Mg) particles with a size in range of 105-150 µm;
    mixing said sand particles and said Mg particles in a predefined ratio to obtain a Sand-Magnesium (SM) mixture;
    subjecting said SM mixture to heat at a temperature for a duration of five minutes to obtain Si sample; and
    purifying said obtained Si sample by removing a portion of Mg by-product particles.

9. The method of claim 8, wherein said sand particles are obtained by:
    washing sand with an alkali and Hydrochloric acid (HCl) and followed by washing with distilled water;
    drying said washed sand at a temperature for a predefined time; and
    pulverizing said washed sand.

10. The method of claim 8, wherein said SM mixture is heated in a microwave furnace at said temperature, the temperature being 800° C., for said duration, the duration being five minutes.

11. The method of claim 8, wherein said portion of Mg by-product particles in said obtained Si sample is purified by:
    adding a predefined concentration of HCl at a predefined temperature to said Si sample;
    stirring for a predefined time;
    subjecting said Si sample to centrifugation for removing HCl from said Si sample; and
    washing said Si sample with De-Ionized (DI) water.

12. The method of claim 8, wherein said portion of Mg by-product particles in said Si sample is purified by:
    washing said Si sample with HCl followed by washing with DI water; and
    drying said washed Si sample at a predefined temperature for a predefined time.

13. The method of claim 8, wherein said Si sample is obtained without washing said sand particles using HF.

14. The method of claim 8, wherein said portion of Mg by-product particles comprises at least one of $Mg_2SiO_4$ and Magnesium oxide (MgO).

* * * * *